(12) United States Patent
Blanchflower et al.

(10) Patent No.: US 9,183,546 B2
(45) Date of Patent: Nov. 10, 2015

(54) METHODS AND SYSTEMS FOR A REMINDER SERVICER USING VISUAL RECOGNITION

(75) Inventors: Sean Mark Blanchflower, Cambridge (GB); James Loxam, Cambridge (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 397 days.

(21) Appl. No.: 13/268,256

(22) Filed: Oct. 7, 2011

(65) Prior Publication Data
US 2013/0088337 A1   Apr. 11, 2013

(51) Int. Cl.
| | | |
|---|---|---|
| G08B 3/00 | (2006.01) | |
| G06Q 10/10 | (2012.01) | |
| H04N 21/472 | (2011.01) | |
| H04W 4/04 | (2009.01) | |
| H04N 21/258 | (2011.01) | |
| H04N 21/414 | (2011.01) | |
| H04N 21/422 | (2011.01) | |
| H04N 21/4223 | (2011.01) | |
| H04N 21/44 | (2011.01) | |
| H04N 21/488 | (2011.01) | |
| H04N 21/61 | (2011.01) | |
| H04N 21/658 | (2011.01) | |

(Continued)

(52) U.S. Cl.
CPC ............. *G06Q 10/109* (2013.01); *G08B 3/00* (2013.01); *H04L 67/26* (2013.01); *H04N 21/25841* (2013.01); *H04N 21/25866* (2013.01); *H04N 21/41407* (2013.01); *H04N 21/4223* (2013.01); *H04N 21/42202* (2013.01); *H04N 21/44008* (2013.01); *H04N 21/47214* (2013.01); *H04N 21/4882* (2013.01); *H04N 21/6131* (2013.01); *H04N 21/6181* (2013.01); *H04N 21/6582* (2013.01); *H04N 21/812* (2013.01); *H04N 21/8173* (2013.01); *H04W 4/04* (2013.01); *H04W 4/043* (2013.01); *H04W 4/185* (2013.01); *H04N 21/4782* (2013.01); *H04N 21/84* (2013.01)

(58) Field of Classification Search
None
See application file for complete search history.

(56) References Cited

U.S. PATENT DOCUMENTS 6,370,282 B1    4/2002  Pavley et al.
7,319,987 B1 *  1/2008  Hoffman et al. ................ 705/44

(Continued)

FOREIGN PATENT DOCUMENTS

JP    2011039647 A  *  2/2011

OTHER PUBLICATIONS

International Search Report & Written Opinion received in PCT Application No. PCT/US2012/058265, Feb. 22, 2013, 13 pages.

*Primary Examiner* — Brian Zimmerman
*Assistant Examiner* — Kevin Lau
(74) *Attorney, Agent, or Firm* — Rutan & Tucker, LLP

(57) ABSTRACT

A downloadable reminder application uses object recognition technology to recognize one or more objects appearing on a display screen of the mobile computing device and matches them to a set of known target objects. The downloadable reminder application process any associated trigger conditions for the target object. The downloadable reminder application then sets the future reminder for the target object to activate. The downloadable reminder application when it detects that a mobile computing device is satisfying the trigger condition for a target object for which it has set a future reminder on, then the downloadable reminder application in the mobile computing device fires the future reminder that was set for that target object and provides the alert to the user along with any triggerable contributions associated with that target object.

16 Claims, 8 Drawing Sheets

(51) Int. Cl.
  *H04N 21/81* (2011.01)
  *H04L 29/08* (2006.01)
  *H04W 4/18* (2009.01)
  *H04N 21/4782* (2011.01)
  *H04N 21/84* (2011.01)

(56) References Cited

U.S. PATENT DOCUMENTS

| | | | |
|---|---|---|---|
| 2001/0012281 A1* | 8/2001 | Hall et al. | 370/338 |
| 2004/0227768 A1 | 11/2004 | Bates et al. | |
| 2006/0120686 A1* | 6/2006 | Liebenow | 386/40 |
| 2006/0190506 A1* | 8/2006 | Rao et al. | 707/204 |
| 2007/0257934 A1* | 11/2007 | Doermann et al. | 345/606 |
| 2008/0232651 A1* | 9/2008 | Woo | 382/118 |
| 2009/0082045 A1* | 3/2009 | Mitchell et al. | 455/466 |
| 2009/0285492 A1 | 11/2009 | Ramanujapuram et al. | |
| 2010/0227598 A1* | 9/2010 | Roach | 455/417 |
| 2010/0281143 A1 | 11/2010 | Krahn et al. | |
| 2010/0295676 A1* | 11/2010 | Khachaturov et al. | 340/540 |
| 2011/0171941 A1 | 7/2011 | Cusick et al. | |
| 2011/0231766 A1* | 9/2011 | Chao et al. | 715/730 |
| 2011/0241872 A1* | 10/2011 | Mahaffey | 340/539.13 |
| 2012/0150620 A1* | 6/2012 | Mandyam et al. | 705/14.39 |

* cited by examiner

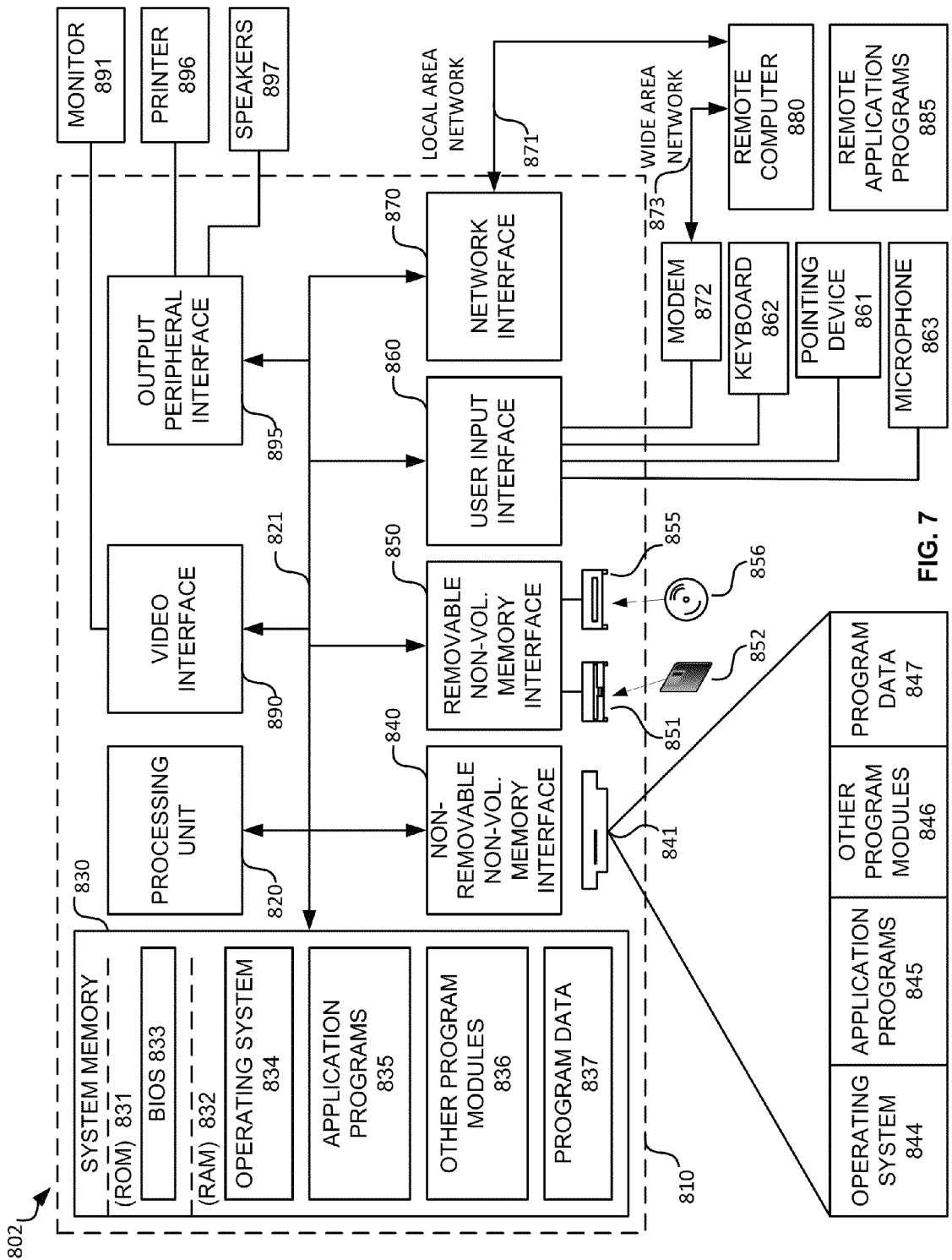

METHODS AND SYSTEMS FOR A REMINDER SERVICER USING VISUAL RECOGNITION

FIELD

Embodiments of the present invention generally relate to the field of downloadable applications cooperating with a backend server system, and in some embodiments, specifically relate to the setting of future reminders based on visual recognition of an object.

BACKGROUND

Various types of video capturing devices are available in the market today at very affordable prices. This allows many consumers the ability to capture video for any occasions at any place and any time. Typically, the content of the captured video is limited to what is visible to the operator of the video capture device. For example, when the operator is videotaping a building because of its unique architecture, what the operator sees in a viewfinder or on a display of the video capturing device are images of the same building and nothing more. Further, the artificial intelligence to do some action based on recognizing objects within the current stream of video is not common in these video capturing devices. Current reminder techniques typically involve setting timers or using calendars. However, they still fail to meet the needs of many users in today's environments, especially in the mobile computing arena.

SUMMARY

For some embodiments, a reminder system is described having a downloadable reminder application and a backend reminder server system. A reminder application database in the backend reminder server system is configured to store multiple instances of a downloadable reminder application. The backend server system is configured to serve a given instance of the downloadable reminder application to a mobile computing device. Each downloadable reminder application is configured to be resident in its own mobile computing device. The backend reminder server system has a set of engines and databases that are configured to work with and exchange information with the multiple instances of the downloadable reminder application. A target object database in the set of databases is configured to store and maintain a complete master set of all known target objects in the backend server system. A trigger condition database 332 is configured to store trigger conditions for each known target object. A reminder engine is configured to generate customized reminder packets for each instance of the downloadable reminder application based on an entry in the set of databases that a future reminder is currently set for that target object with its current trigger conditions for that target object in that instance of the downloadable reminder application. Each instance of the downloadable reminder application is scripted to use its customized reminder packet to detect when the known target objects satisfy their trigger conditions.

BRIEF DESCRIPTION OF THE DRAWINGS

The multiple drawings refer to the embodiments of the invention. While embodiments of the invention described herein is subject to various modifications and alternative forms, specific embodiments thereof have been shown by way of example in the drawings and will herein be described in detail.

FIG. 7 illustrates a block diagram of an example computing system that may use an embodiment of one or more of the software applications discussed herein.

DETAILED DESCRIPTION

In the following description, numerous specific details are set forth, such as examples of specific data signals, components, connections, etc. in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention. It is to be understood that other embodiments can be used and structural changes can be made without departing from the scope of the embodiments of this invention. Also, it should be appreciated that one or more structural features described in one embodiment could be implemented in a different embodiment, even if not specifically mentioned as being a feature thereof.

Figure 2:
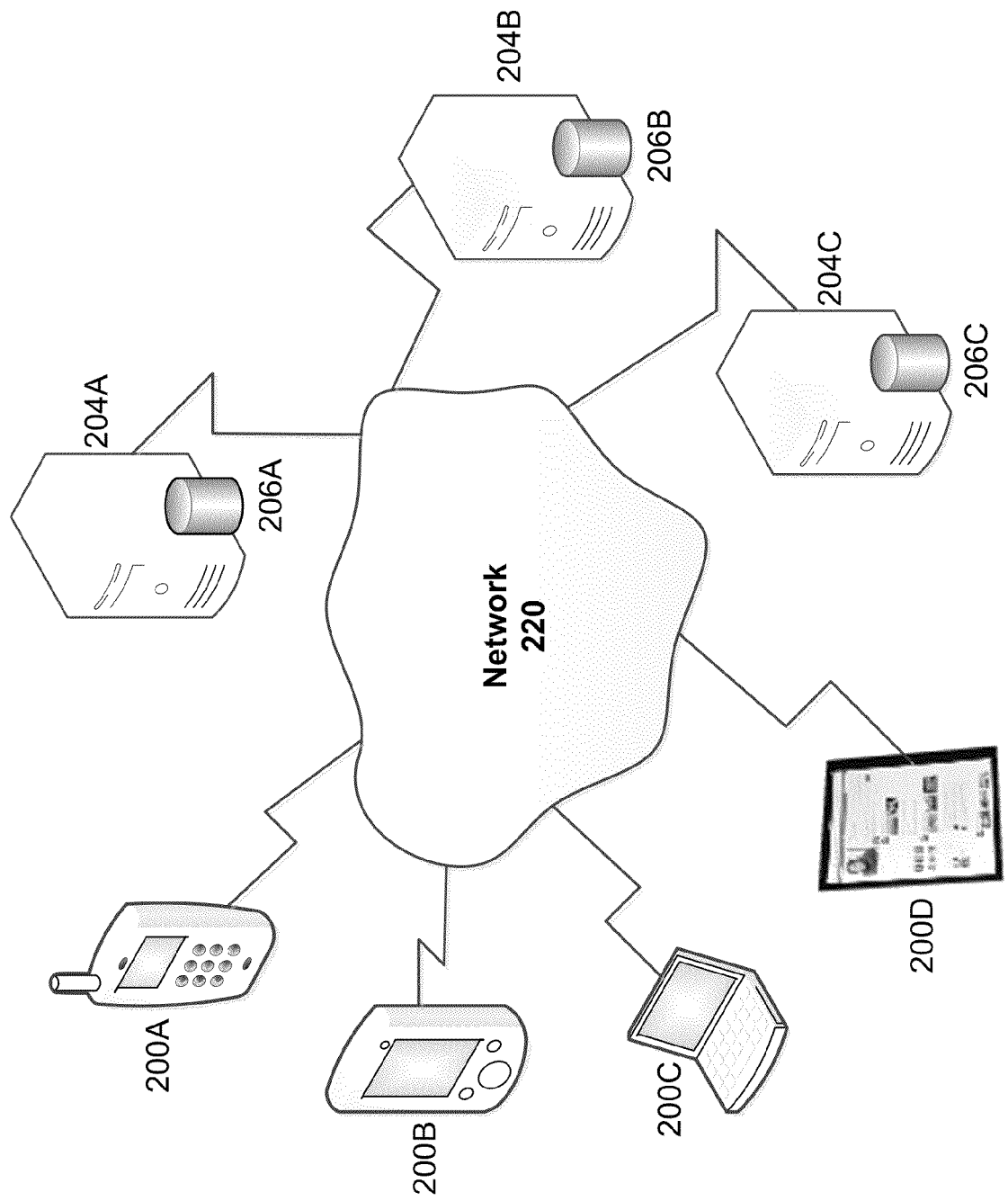
FIG. 2 illustrates a diagram of a network environment in which the techniques described herein may be applied.

FIG. 7 and FIG. 2 illustrate example environments to implement the reminder service using visual recognition herein.

Overview

In general, the reminder experience as described herein relates to an experience with minimal actions from a user that the user can enjoy with a mobile computing device. The techniques described herein may enable the users to use the mobile computing device to identify information that may be used to trigger future reminders. The information may be captured using a still camera device, a video capturing device, browsing on the Internet, and captured from other feed sources, and may include video, images, and/or audio signals. Many embodiments are discussed, however in an embodiment, a visual recognition module of the downloadable reminder application may be configured to use object recognition technology to recognize one or more objects appearing on a display screen of the mobile computing device and match them to a set of known target objects stored in the local target database. The downloadable reminder application in the mobile computing device can then after recognizing and matching the target object appearing on the display screen, process any associated trigger conditions for the target object. The downloadable reminder application then sets the future reminder for the target object to activate. When the downloadable reminder application sets up the future reminder for the target object, then the downloadable reminder application transmits a communication to the reminder engine in the backend server system. The reminder engine receives the flagged target object to set the reminder on, updates its databases, checks what the latest triggering conditions and triggerable contributions are for that target object, and sends an updated reminder packet over the public wide area network back to the downloadable reminder application. The downloadable reminder application when it detects that the mobile computing device is satisfying the trigger condition for a target object for which it has set a future reminder on, then the downloadable reminder application in the mobile computing device fires the future reminder that was set for that target object and provides the alert to the user along with any triggerable contributions associated with that target object.

Mobile Computing Device and a Reminder Service Using Visual Recognition

Figure 1:
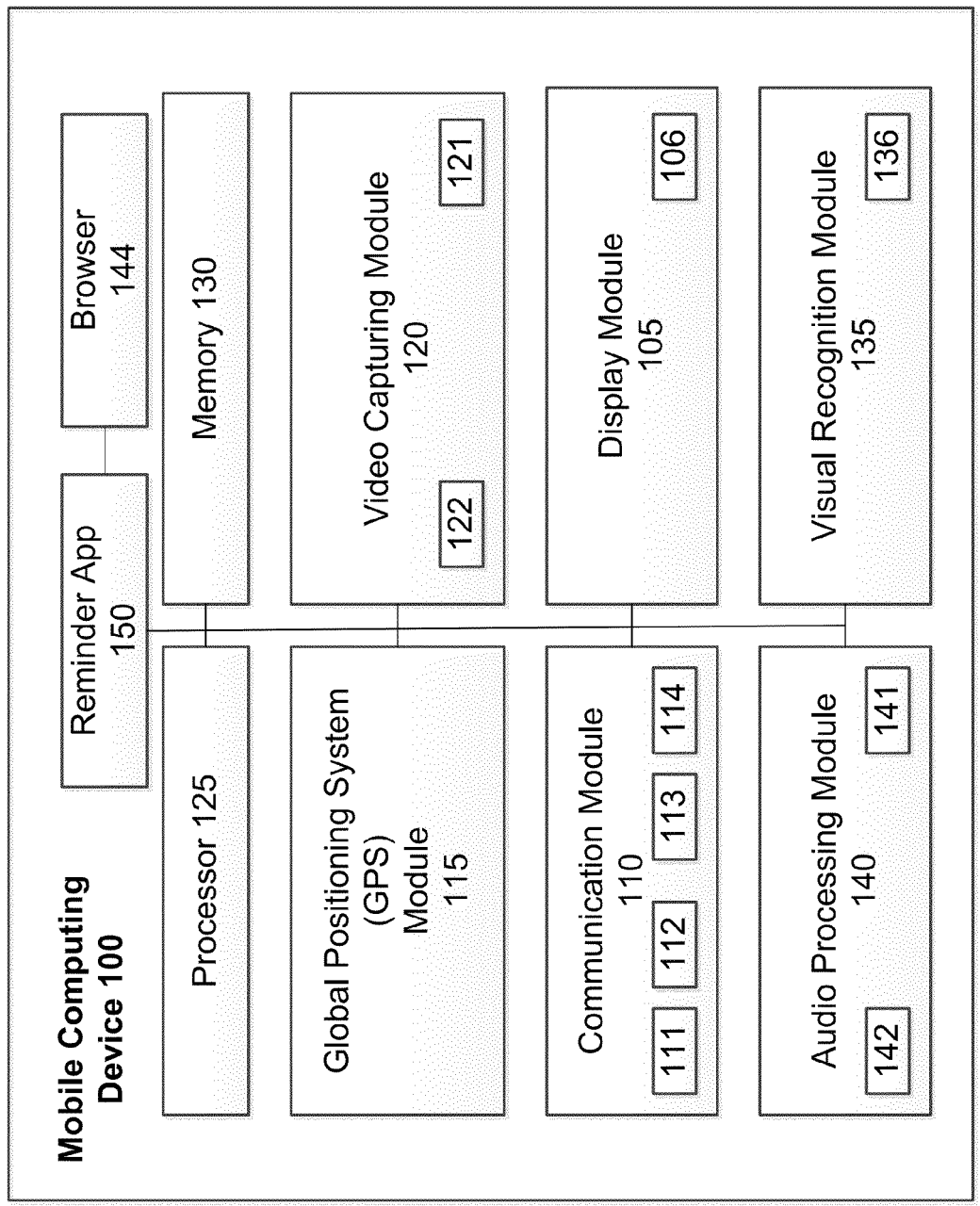
FIG. 1 illustrates one example of block diagram of a mobile computing device that may be used, in accordance with some embodiments.

FIG. 1 illustrates one example of block diagram of a mobile computing device that may be used, in accordance with some embodiments. Mobile computing device 100 may include display module 105, wireless communication module 110, global positioning system (GPS) module 115, video capturing module 120, processor 125, browser application 144, the downloadable reminder application 150, memory 130, and multiple other applications and modules. The mobile computing device 100 may be, for example, a smart cellular phone, a laptop, a netbook, a touch pad, or any other similar device. The downloadable reminder application 150 and its application program interfaces and call routines are configured to work with the various blocks of functionality 105, 110, 125, 144, 115, 140, in the mobile computing device. Likewise, the downloadable reminder application 150 routines are configured to communicate and cooperate with a reminder engine in a backend server system via the communication module 110. The downloadable reminder application 150 includes a visual recognition module 135 to assist in the identification of objects captured in, for example, each video frame as well as then highlight actionable objects in the frames of the video stream. Alternatively, an existing visual recognition module 135 in the mobile computing device 100 may be enhanced by portions of the downloadable reminder application 150.

Figure 3A:
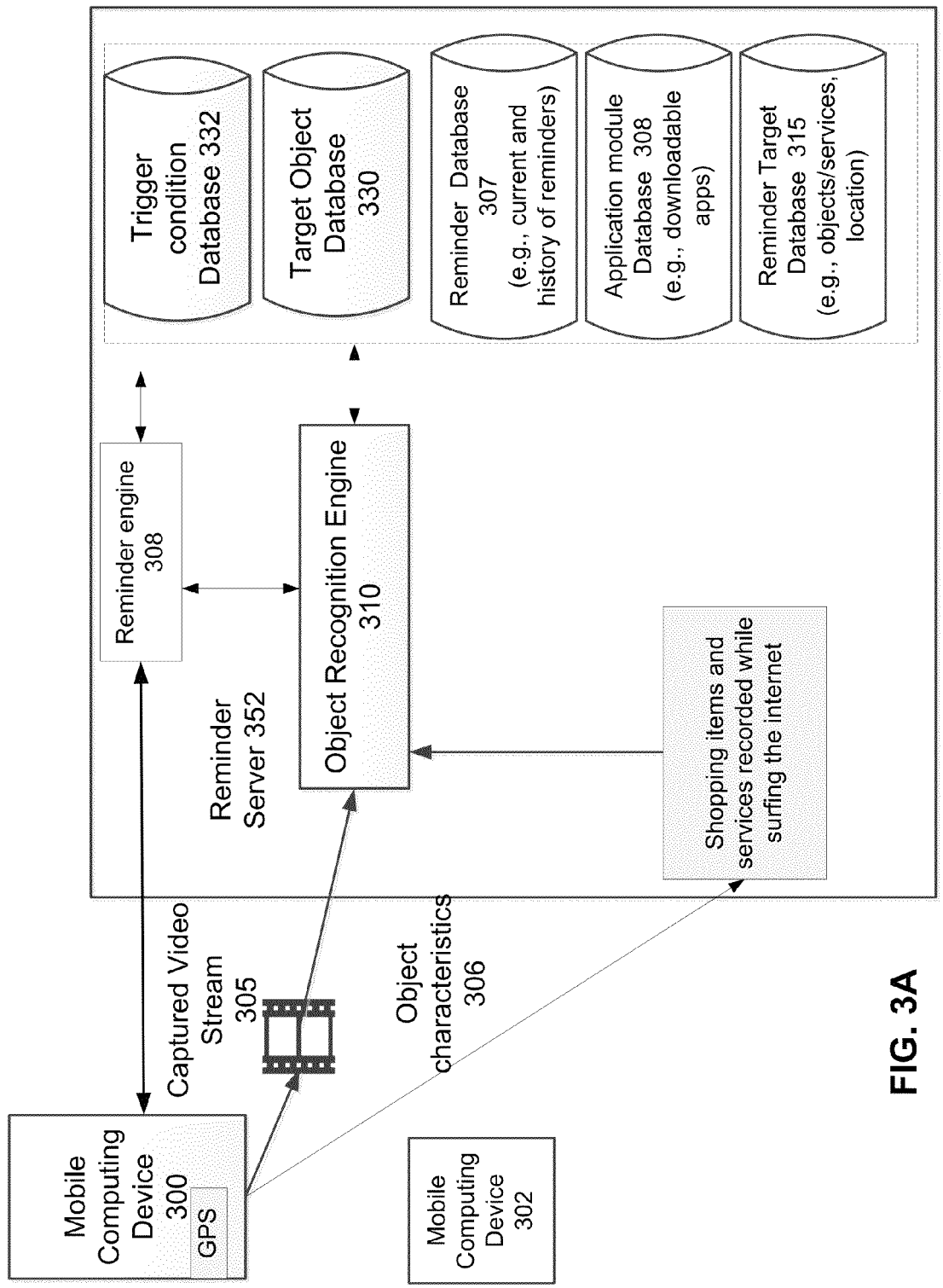
FIG. 3A illustrates an example of a backend reminder server system with a set of engines and databases that are configured to work with and exchange information with a downloadable reminder application configured to be resident in mobile computing device, in accordance with some embodiments.
Figure 3B:
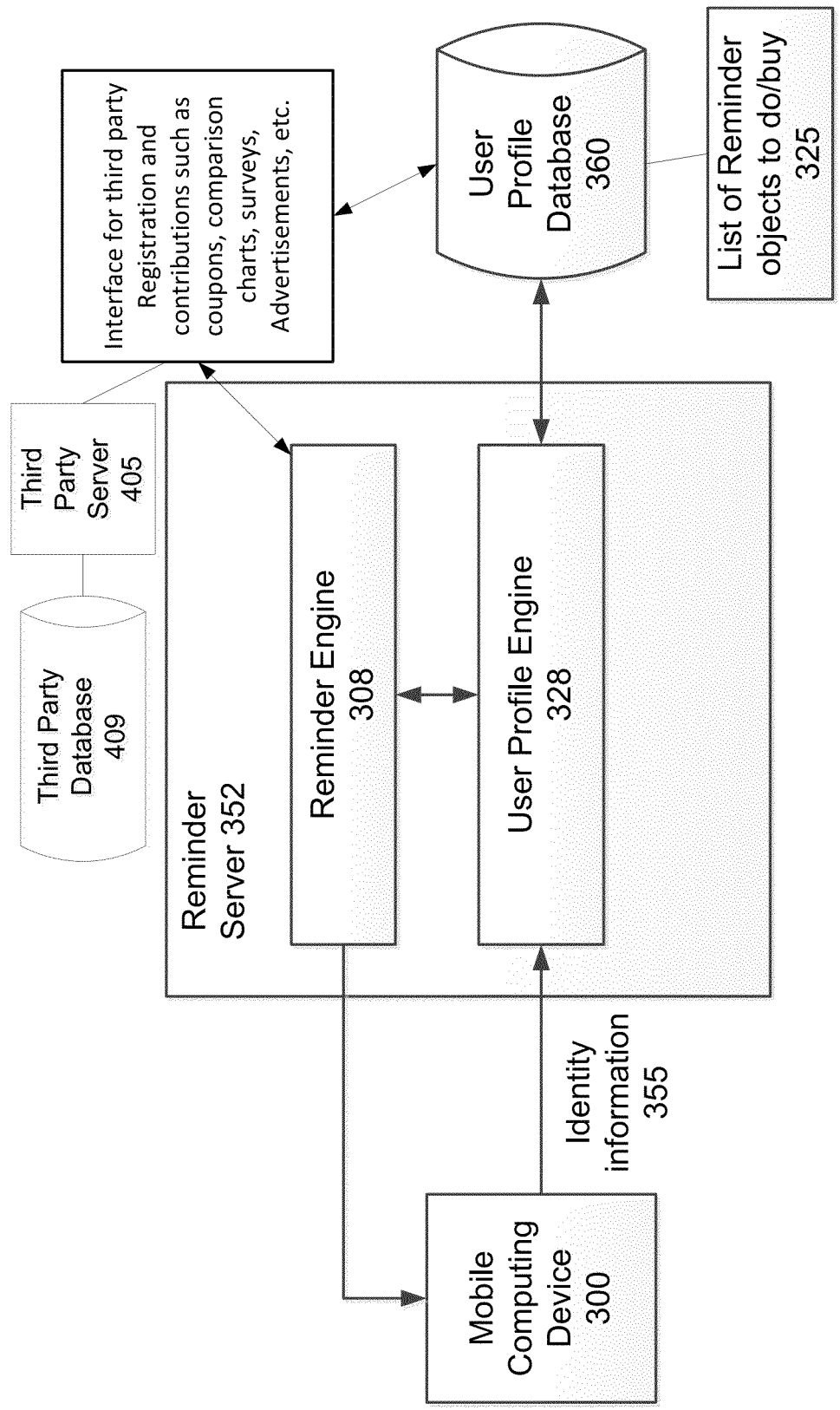
FIG. 3B illustrates a diagram of an example of backend reminder server system that may be connected with one or more third party servers via the Internet, in accordance with some embodiments.
Figure 4:
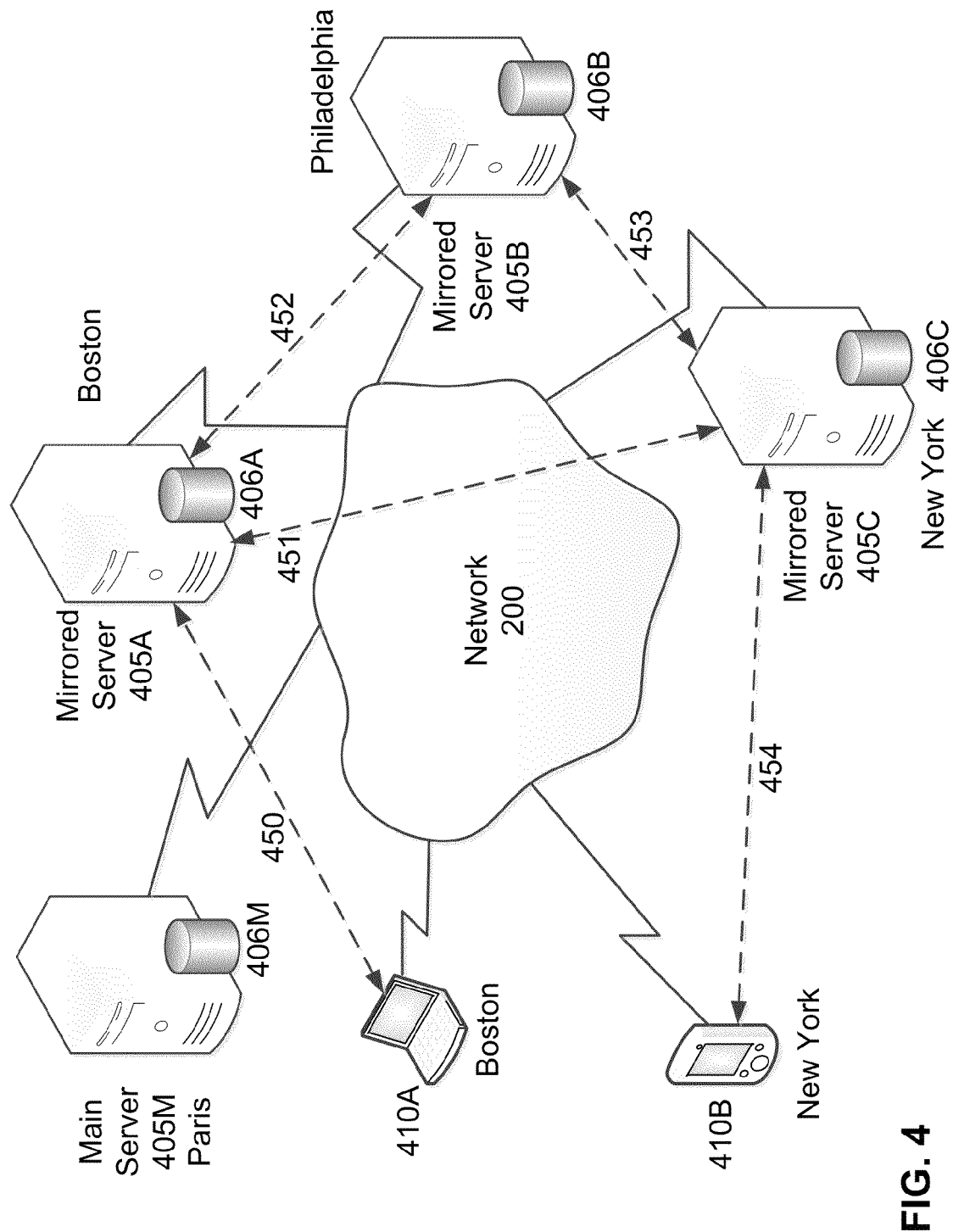
FIG. 4 illustrates an example diagram of a network of mirrored backend reminder server system that may be used to perform the reminder processing, in accordance with some embodiments.

The communication module 110 may be used to allow the mobile computing device 100 to be connected to a public wide area network such as, for example, (see FIGS. 2-4). The communication module 110 may be configured to enable the mobile computing device 100 to connect to the public wide area network using wireless communication protocol or any other suitable communication protocols. For example, the communication module 110 may include a wireless fidelity (Wi-Fi) module 111, a Bluetooth module 112, a broadband module 113, a short message service (SMS) module 114, and so on. As will be described, the communication module 110 may be configured to transmit information including visual information associated with a video stream from the mobile computing device 100 to one or more servers in the backend server system connected to the network. The downloadable reminder application 150 has one or more locations of servers (e.g. Universal Resource Locations) stored and security protocol routines in order to create secure communications with the backend server system over the public wide area network. The downloadable reminder application 150 is scripted to create a communication connection between itself and a reminder engine resident in the backend server system by cooperating with the communication module 110.

The GPS module 115 may be used to provide the mobile device's geographical location to the downloadable reminder application 150. The geographical location information may be monitored or called for by the downloadable reminder application 150. The GPS module 115 may also be used to enable generating the geographical information and associating the geographical information with images and frames of video streams. This process is typically referred to as geotagging. When the mobile computing device 100 is used to capture a video stream, the geographical information may be inserted into one or more the frames of the video stream. The geographical information may also be inserted and stored with images, video streams, and text messages generated by the mobile computing device 100. The geographical information may be stored as metadata, and may include latitude and longitude coordinates.

The video capturing module 120 may be configured to capture images or video streams. The video capturing module 120 may be associated with a video camera 121 and may enable a user to capture the images and/or the video streams. The video camera 121 may be a built-in video camera.

The downloadable reminder application 150 is scripted to set a future reminder on a target object, to be triggered based on local and temporal trigger conditions including but not limited to 1) time of day indicated by a clock function of the mobile computing device, 2) date and time of day indicated by the clock function, 3) an amount of time from an initial start time by referencing the clock function, 4) a visual recognition of the target object being displayed on a display screen of the mobile computing device, 5) a current geographic location of the mobile computing device indicated by a GPS module of the mobile computing device, and 6) any combination of these five. Thus, the future reminder can be set simply by pointing the mobile computing device's 100 camera at some pre-determined object that is visual recognized by the downloadable reminder application 150 as a target object and selecting to then set the future reminder. First, the user points the camera, digital still or video camera, of the mobile computing device 100 at a given object. The visual recognition portion of the downloadable reminder application 150 resident in the mobile computing device 100 is scripted to perform recognition operations to recognize a target object. This may include comparing the reminder target object with the known target objects stored in the target database of the mobile computing device to determine when there is a match. Note, the local target object database in the mobile computing device is a smaller subset of known target objects, than the full set of all known target objects to the backend server system, which is stored in a target object database in the backend server system. The target database of the mobile computing device may be simply a cache memory that is frequently updated using content coming from the target database of the backend server system.

Each future reminder will contain a trigger condition to be satisfied for the target object. As discussed, the trigger condition may be based on local and temporal trigger conditions including but not limited to 1) time 2) visually recognizing that object being displayed on the display screen and being analyzed by either the visual recognition module of the downloadable reminder application 150 or the recognition engines in the backend server system or any combination of both, and 5) geographic location indicated by the GPS module of the mobile computing device. The downloadable reminder application 150 is scripted to have its application program interfaces and call routines monitor the blocks of functionality in the mobile computing device, (E.g. GPS module 115, the clock, the video capturing module 120, etc.) to determine when the computing device 100 satisfies any above trigger condition for the target object, and then the future reminder for this instance of the downloadable reminder application 150 is triggered.

Each known target object may have both triggerable conditions to trigger the future reminder on that known target object and triggerable contributions associated with the known target object to cause an additional beneficial action beyond the alert when the future reminder on that known target object is triggered. Thus, the downloadable reminder application 150 is scripted to notify a user that the future reminder on the target object is triggered via an alert along with the causing of any associated triggerable contributions associated with the target object. The user is alerted via an alert 1) appearing on a display screen of the mobile computing device, 2) through an audile alert via speakers of the mobile computing device, 3) through a vibrating of the mobile computing device, and 4) any combination of the three. Third party vendor systems and the backend server system may add on valuable triggerable contributions, coupons, comparisons, video trailers, associated with a given target object and executed when the triggering condition occurs.

Note, the downloadable reminder application 150 may be configured to set a future reminder to trigger at a subsequent time based on subsets of the trigger conditions such as merely 1) a geographical location of the mobile computing device as determined by a built-in global positioning system (GPS) module or 2) a specific time established by a third party, or 3) recognizing the target object in a current video stream being captured by the camera of the mobile computing device.

The display module 105 may be associated with a display screen 106. The display module 105 may be configured to display the images and/or the video streams captured by the video capturing module 120 on the display screen 106. The display module 105 may also display images from a still camera or from a browser on the display screen 106. For some embodiments, the downloadable reminder application 150 is scripted to cooperate with the display module 105. The downloadable reminder application 150 may be also scripted to enhance certain objects appearing on the display screen with a high lighting, including objects appearing in still images, on web pages, in video streams, and any combination of the three, that 1) have been or 2) can be and 3) any combination of the two, set as a candidate target object that actionable future reminders can be set for. The candidate target object that actionable future reminders can be set for is enhanced with the high lighting around the target object on the display screen. The user may use 1) finger touches, 2) mouse clicks, or 3) otherwise select the highlighted target to set the future reminder on that target object.

The downloadable reminder application 150 is also scripted to be able to flag any objects appearing on the display screen of the mobile computing device, including objects potentially coming from a video stream, web browsing, etc., and then send the flagged object to the backend server system through the communication module 110. One or more recognition engines in the backend server system then are configured to analyze the flagged object in an attempt to identify the flagged object and make a known target object.

The memory 130 may include internal memory and expansion memory. For example, the internal memory may include read-only memory (ROM) and random access memory (RAM), and the expansion memory may include flash memory. The memory 130 may be used to store an operating system (OS), the software portions of the downloadable reminder application 150, and various other applications including, for example, productivity applications, entertainment applications, communication applications, image and/or video processing applications, user interface applications, etc. The memory 130 also stores reminder packets sent by the reminder engine in the backend server system. The reminder engine in the backend server system is configured to send one or more digital fingerprints of known target objects that have actionable trigger conditions in a reminder packet to the downloadable reminder application 150 to update a local target object database of known target objects set for that specific instance of the downloadable reminder application 150. The reminder packets form a small subset of known target objects for the unlimited number of possible objects in the world. The reminder packets also form a small subset of known target objects as compared to the amount of known target objects stored in the target object database in the backend server system. The downloadable reminder application 150 is configured to recognize the reminder target object using this small subset of known target objects. The downloadable reminder application 150 is also scripted to use these reminder packets to detect trigger conditions, determine triggerable contributions, and other information. Thus, the reminder engine is scripted to generate customized reminder packets for each instance of the downloadable reminder application 150, and thus, each instance of the application may have a different set of known target objects in its local target object database.

The volatile portion of the memory 130 stores certain portions of the code for the downloadable reminder application 150 as well. The processor 125 may be configured to execute instructions associated with the OS, network browsers 144, and the various applications. Some examples of the OS may include Android from Google, iOS from Apple, Windows Phone from Microsoft, and WebOS from Palm/HP, and so on. The network browsers 144 may be used by the mobile computing device 100 to allow the user to access websites using the network.

For some embodiments, the visual recognition module 135 of the downloadable reminder application 150 is configured to process images and/or video streams captured by the video capturing module 120 or images supplied by the browser 144 or images supplied by the display module 105. For example, the downloadable reminder application 150 is configured to perform recognition operations to identify any objects within each frame of the captured video stream to determine whether one or more target objects are contained on that frame of the captured video stream to be displayed on the display screen. The visual recognition module 135 is scripted to perform recognition operations to recognize the target object, including comparing the objects within each frame of the captured video stream to known target objects stored in the local target object database stored in a memory of the mobile computing device, in order to determine when there is a close match between the objects in the frame and the known target objects. When the reminder target object is not in the database of known objects, then the object may be sent to the numerous engines for comparisons and finding potential matches to the target object.

The visual recognition module 135 of the downloadable reminder application may analyze, for example, the frames of the captured video stream and identify the objects within each frame of the captured video stream. Some of those objects will be close matches to the small subset of known target objects. Identifying points of interest for an analyzed object may include breaking the object into geometric shapes and distinctive features. The operations may break down each object into different geometric shapes and associated distinctive features. This will form sort of a digital fingerprint for that object.

As discussed, when the visual recognition module 135 of the downloadable reminder application 150 sends the video stream to the backend server through the communication module 110, the video stream may also be analyzed by the engines in the backend server system as well. The visual recognition module 135 may analyze each captured frame of the video stream. The visual recognition module 135 may analyze these frames to identify the characteristics or visual information of the object. The visual recognition module 135 may also relate patterns from the series of frames to assist in determining what the points of interest are for an object. As the video capturing module 135 continues to capture the video stream, it may be possible that the visual recognition module 135 may identify many different objects.

The visual recognition module 135 may generally perform recognition operations, including object analysis for identifying distinguishing characteristics of an object, basic scene analysis, optical character recognition (OCR), etc., to extract any distinctive features of the objects appearing on the display screen 106 and then code the distinctive features of the object into a digital fingerprint of that object, which is then compared with a set of digital fingerprints of known target objects stored in a local target object database stored in a memory of the mobile computing device. Note, the visual recognition module 135 may also detect the geographical information of that object and other known distinctive features for that object and then also include this metadata in the digital fingerprint of that object.

Note, the visual recognition module 135 can analyze against a JPEG or MPEG type file, as well as files with merely distinctive features including shapes, dot-to-dot type X-Y coordinates of the shapes, patterns colors, letters numbers, symbols, etc. associated with objects.

Note, similar analysis to a captured video stream analysis may occur when monitoring the browser and the user's surfing on the Internet. However a web pages metadata is collected to aid in the identification of objects appearing during the Internet session. Shopping items, services, broadcast programs, etc. may be identified as target objects while the browser is being used to navigate through the Internet.

FIG. 3A illustrates an example of a backend reminder server system with a set of engines and databases that are configured to work with and exchange information with a downloadable reminder application configured to be resident in mobile computing device, in accordance with some embodiments. A browser of the mobile computing device 300 may download the downloadable reminder application over the public wide area network from the backend reminder server system 352. A user of the mobile computing device 300 may need to register the mobile computing device 300 with the reminder engine 308 in the server 300 to enable the downloaded reminder application modules to be run on the mobile computing device 300. Backend reminder server system 352 may include a communication module (not shown) to allow it to be connected to a network such as the network 200 illustrated in FIGS. 2 and 4, then to one or more mobile computing devices 300, 302. Communication sessions may be established between the reminder engine 308 of the backend reminder server system 352 and the mobile computing device 300 to enable the receipt of the visual information, geographic location information, etc. from the mobile computing device 300 and the reminder engine 308 to transmit information including the reminder packets to the mobile computing device 300. Multiple mobile computing devices will normally be in regular communication with the backend server system. The backend reminder server system 352 may include one or more servers having one or more databases. For some embodiments, the backend reminder server system 352 may be include a reminder engine 308, an object recognition engine 310, target object database of known target objects 330, reminder database of current reminders and history of reminders for each instance of the downloadable reminder application 315, a trigger condition database 332, which also includes geographic locations of known target objects, a reminder database 350, and many other components.

The target object database 330 is configured to store objects/services/broadcast programs that can be used to recognize the reminder target object. The target database 330 may store one or more composite images of all of the known target objects. The object recognition engine 310 may include a facial recognition engine, a scene analysis engine, an optical character recognition engine, and other visual analysis engines. The object recognition engine 310 may be associated with the target object database 315 to detect known target objects as well as determine and create information about new known target objects.

The reminder engine 308 may be configured to perform operations that enable the future reminders to be set, a future reminder condition to be monitored, and the future reminder to be triggered. For example, the reminder engine 308 may receive information from multiple mobile computing devices 300, 302 about the reminder target objects that have been selected and about the locations of the mobile computing devices 300, 302. The reminder engine 308 may interact with the object recognition engine 310 to recognize the target objects. The reminder engine 308 may continuously or periodically monitor for the trigger conditions to trigger the future reminders for the target objects. As discussed, the trigger conditions may be related to the location of the mobile computing device 300, a time related to an occurrence of an event associated with the reminder target objects, etc. The reminder engine 308 may store the future reminders for every instance of the downloadable reminder applications that have been deployed in the reminder database 307 and periodically send reminder packets to the instance of the downloadable reminder applications to update the current reminders scheduled for each instance of the downloadable application.

The target object database 330 stores and maintains a complete master set of all known target objects in the backend server system. The trigger condition database 332 configured to store trigger conditions for each known target object. The trigger condition database 332 may be a relational database that makes a nexus of all the possible triggerable conditions for each of those known target objects as well as any specific trigger conditions currently set for each instance of the downloadable reminder application for a specific target object. The reminder engine 308 is configured to generate customized reminder packets for each instance of the downloadable reminder application based on the nexus matchings for that instance and an entry in the set of databases that a future reminder is currently set for that target object with its current trigger conditions for that target object in that instance of the downloadable reminder application.

Next, both the downloadable application in the mobile computing device 300, 302 and an interface for third parties presented by the backend mirrored server system can be used as the initial starting point to use the object recognition engine 310 in the backend server system to identify an object to set a future reminder on. Thus, both an instance of the downloadable application in the mobile computing device and an interface for third parties presented by the backend server system are used as sources to supply objects to the object recognition engine 310 in the backend server system to identify an object to create a target object with an actionable a future reminder. The downloadable reminder application is configured to enable a user of the mobile computing device 300 to select an object and flag the object as a candidate to make a known target object. Likewise, the third party interface is configured to solicit a third party administrator to identify an object to set a future reminder on and assign actionable trigger conditions for a future reminder for that object, and then the interface for third parties is configured to send the object to the object recognition engine 310 in the backend server system. The third party will be described in more detail in FIG. 3B. Code, including one or more routines, is scripted to set personal future reminders in a downloadable reminder application resident in a mobile computing device 300 through a combination of image recognition, scene analysis, OCR, metadata analysis, etc. from 1) a video feed, 2) a still picture of the object, 3) monitoring the browser activity and web pages appearing on the display of the mobile computing device, and 4) any combination of these three object feeding sources.

In an embodiment, once the potential object on which the user of the mobile device wishes to set a future reminder on is set, either the 1) user/third party administrator affirmatively indicates the object/service in the image of 1) a still photo, 2) the video feed, and/or 3) displayed on the browser, should be flagged as the reminder target object. The positively affirmed and identified reminder target object is sent to the object recognition engine 310 in the backend server system to be identified via matching to known target objects in the database or by further analysis and web crawling to find the closest matches on the Web. A number of possible candidate objects can be presented on the display screen of the mobile device as a list of possible matching items to the identified and flagged object to the user of the mobile device and the user will select which is the correct one. The backend server system can scale to a large number of recognizable target objects with an indefinite number of future reminders and send subsets of possible recognizable known target objects and triggerable conditions in the reminder packets customized for that instance of the downloadable reminder application. Note, as later described, the system may treat objects supplied by third party administrators in a similar manner Accordingly, when the reminder engine 308 receives the potential object desired to have an actionable reminder function, then the reminder engine 308 cooperates with the object recognition engine 310 and other any other engines to analyze the object. The reminder engine 308 then sends back to the downloadable reminder application a number of possible candidate objects presented as a list of possible closest matching items recognized by the engines to the potential object desired to have an actionable reminder function. The user of the mobile computing device can positively affirm that the potential object was correctly identified by the system and then set this object as a target object. The object recognition engine 310 in the backend server system logs in an entry in the target object database 330 if the identified target object was new to the system. The reminder engine 308 in the backend server system logs in an entry in the reminder database 307 to set a current reminder for that target object for this instance of the downloadable application and any triggerable conditions and triggerable contributions actionable with that target object.

The reminder engine 308 then sends a reminder packet that includes one or more objects to the downloadable reminder application to establish or update the local database of known target objects stored in the memory of the mobile device.

An Example Operation of the System May be as Follows.

The reminder engine 308 in the backend server system sends one or more of those digital fingerprints in a reminder packet of known target objects that have actionable trigger conditions to each instance of the downloadable reminder application to update the current subset of target objects. The reminder engine 308 generates the customized reminder packets for each instance of the downloadable reminder application and sends the customized reminder packets over the wide area network to be stored in a memory/cache of the mobile computing device. The downloadable reminder application regularly references the local target database and actively requests regular updates for the customized reminder packet rather than having the reminder engine 308 pushing the updates of the customized reminder packet to each instance of the downloadable reminder application. In the alternative, the reminder engine 308 pushes the reminder packet updates to each instance of the downloadable reminder application.

As discussed, the visual recognition module of the downloadable reminder application is configured to allow a consumer the ability to set a reminder simply by pointing their smart phone or tablet device at a related object and confirming that a future reminder should be set. The user points the video camera of the mobile computing device, such as a smart phone or tablet, at an object. The target objects already known by the system potentially appear with a highlighting around them when appearing on the display screen.

At least two ways exist to select a target object for the reminder service. First, the user may affirmatively indicate the object/service appearing on the display screen of the mobile device on which the future reminder should be set, and the downloadable reminder application sends the identified object/service to a number of recognition engines in the backend server system to be identified. Once positively identified the object is flagged and sent as a target object that a reminder needs to be established for.

Second, alternatively or in combination with the first way, the reminder engine 308 in the backend server system creates in the set of databases, a number of target objects, i.e. objects/services/etc., that can be recognized and accordingly have a triggerable reminder condition associated with that target object. Known target objects may be highlighted in, for example, the video stream being displayed on the display screen of the mobile device. The user may select that object on the display screen and then the trigger conditions and triggerable contributions associated with that target object are set as a reminder for that instance of the downloadable application.

Next, the downloadable reminder application in the mobile computing device uses object recognition technology, including image analysis, scene analysis, OCR, and other routines, to recognize the target object. E.g. The user points the video camera of the mobile computing device points at some image of a pair of shoes, and the resident software on the mobile device identifies the object displayed on the display screen in view of the camera as a pair of shoes flagged as a target object.

Next, the downloadable reminder application in the mobile computing device after identifying the target object appearing on the display screen, the system processes any associated reminders and sets them up to activate. E.g. the downloadable reminder application processes the reminder association on the shoes image and sets a reminder based on the location of shops known to sell that pair of shoes. The process may occur solely on the mobile computing device itself or be a dynamic exchange between the downloadable reminder application and processing power on the mobile computing device and the applications and processing power in the backend server system. The processing by the downloadable reminder application along with a dynamic exchange between the downloadable reminder application and the applications and processing power in the backend server system are configured to give the ability to recognize a large number and wide variety of real world objects. The combination gives scalability of on top of what merely device object recognition allows.

The reminder target object or information related to the reminder target object may be sent by the mobile computing device 300 to the backend reminder server system 352 using templates with various fields. The template with various guidance and menus may be presented to the user, and the user fills in the solicited information. The solicited information may be extracted from the template and sent to the reminder engine 308 to set the future reminder and the object recognition engine 310 to identify or match the reminder target object with known target objects stored in the target object database 330.

Next, the reminder engine 308 in the backend server system receives the flagged target object to set the reminder on, updates its databases, checks what the latest triggering conditions and triggerable contributions on a reminder are for that target object and sends back an updated reminder packet to the downloadable reminder application.

At a later time when the downloadable reminder application detects that the computing device is satisfying the reminder trigger conditions, the downloadable reminder application in the mobile computing device and/or the reminder engine 308 in the backend server system fires the reminder set for that target object and alerts the user. E.g. 4 days later, the user walks through the mall and past a shoe shop selling the same pair of shoes. The user's smart phone reminds the user of their desire to purchase the pair of shoes. Triggerable contributions such as price comparisons of the shoes to other shops may also appear, coupons for the shoes or to the store may appear, etc.

The target object database 330 is configured to store information about a group of known objects. The information may describe the different characteristics of the known objects. This may include geographical information, color information, pattern information, and so on. In general, the characteristics of the object may include any information about the object that may be useful to identify the object and recognize it as a known object. For example, an office building located on the corner of Fourth Street and Broadway Avenue in downtown San Francisco may be identified based on its unique pyramid shape architecture and orange color. It may be noted that the object database 330 may be a large database when it is configured to store information about many objects or many groups of objects. Many techniques may be used to generate the information about the objects. For example, the information may be generated by human, or it may be generated by a special computer application coded to scan a color image and generate a list of objects included in the image along with their characteristics.

For some embodiments, the trigger condition database 332 may be configured to store information on possible trigger conditions as well as possible triggerable contributions. The possible triggerable contributions may include additional identification or descriptive information (e.g., the university and its history), advertisement information (e.g., restaurant discount coupons), link information (e.g., a URL link to the website of a restaurant), listing of food establishments in various buildings, links to user reviews for a particular business, links to web pages, etc. Different types of triggerable contributions may be stored for the same target object.

The reminder engine 308 can start transmitting triggerable contributions including the video files, and advertisements and images, textual messages, links to relevant web pages, etc. after the when a trigger condition is satisfied. The visual recognition module 135 then overlays this augmented information onto the frames of the images appearing on the display screen of the mobile device.

The object recognition engine 310 can be configured to take advantage of distributed workload computing across multiple servers to increase the speed of filtering out known images stored in the target object database 330 compared to the characteristics information transmitted by the visual recognition module 135. The object recognition engine 310 may use the geographical information included in the frames of the captured video stream 305 and the information stored in the object database 330 to recognize the objects. For example, the yellow building with the pyramid shape located at latitude coordinate X and longitude coordinate Y may be recognized as the National Financial Building. For some embodiments, the object recognition engine 310 may use a set of filters and apply the filters to the characteristics or visual information received from the mobile computing device 100 to determine whether it can recognize what the object or who the person is. Since the captured video stream 305 is comprised of a series of closely related frames both in time and in approximate location, the frames generally include the same objects and/or persons and the characteristics/visual information may have the same pattern of identified major features of the object (or the points of interest). This may help the object recognition engine 310 to narrow down the matching options that are available in the object database 330. For example, the object recognition engine 310 may recognize the distinctive features for the point of interest as a billboard or poster for a movie, a restaurant such as McDonalds, a building such as an office, historic landmark, residence, etc.

Periodic synchronization may occur between the downloadable reminder application resident in the mobile computing device and the reminder engine 308 of the backend reminder server system 352. When there is a loss of communication connection between the mobile computing devices 300, 302 and the backend reminder server system 352, that instance of the reminder application modules downloaded to the mobile computing device may store objects and commands that the user selects in the non-volatile portion of the memory of the mobile computing device and then transmit those stored objects and commands to the backend reminder server system 352 when the communication connection is re-established.

For some embodiments, the backend reminder server system 352 may enable the mobile computing devices to download application modules necessary to perform the reminder processing operations independently of the backend reminder server system 352. The downloadable application modules may be stored in the application module database 308. For example, when there is no connection with the backend reminder server system 352 (e.g., the Internet service is lost due to coverage or the backend reminder server system 352 system 300 is down), that mobile computing device 350 may operate as described in FIG. 1 where they use the application modules along with the local target database 160 previously downloaded from the backend reminder server system 352. The content of the local target database 160 in the memory of the mobile computing device and the downloadable application modules may be updated during the periodic synchronization with the reminder engine 308 of the backend reminder server system 352.

The downloadable reminder application is scripted to function independently of the backend server system when a communication connection between them is interrupted, for example internet service is lost due to coverage or the mirrored server system goes down. The downloadable reminder application then refers to the set of digital fingerprints for the known target objects in the local target object database stored in the memory of the mobile device, performs its own target object identification with a visual recognition module, stores currently unknown objects desired to be set as target objects, stores any candidate known target objects selected and flagged by the user to have a future reminder set on, as well as stores any commands that the user selects while the communication connection is interrupted in non-volatile portions of the mobile computing device. When the communication connection is re-established between them, the downloadable reminder application is scripted to retrieve the unknown objects, known target objects selected to have a future reminder set, and any commands and then transmit this information over a public wide area network to the reminder engine 308 in the backend server system.

The backend mirrored server system has a reminder database 307 configured to store multiple instances of a downloadable reminder application that the backend server system is configured to serve a given instance of the downloadable reminder application to a mobile computing device requesting an instance to install on that device.

The backend mirrored server system has a reminder database 307 that keeps enough information on reminder service for the multiple instances of the downloadable reminder application, each on its own mobile computing device, to create a backup copy of current future reminders set for each instance of the downloadable reminder application, and a history of past future reminders for each instance of the downloadable reminder application and associate that with a user profile. If a user switches mobile devices the entire user profile along with all the reminders is downloaded to the new mobile device and new instance of the downloadable reminder application. It may be noted although multiple databases are illustrated in FIGS. 3A & 3B, two or more of these databases may be combined or spread over even more databases. Similarly, the engine functions on the server may be combined or spread over even more severs.

Figure 5:
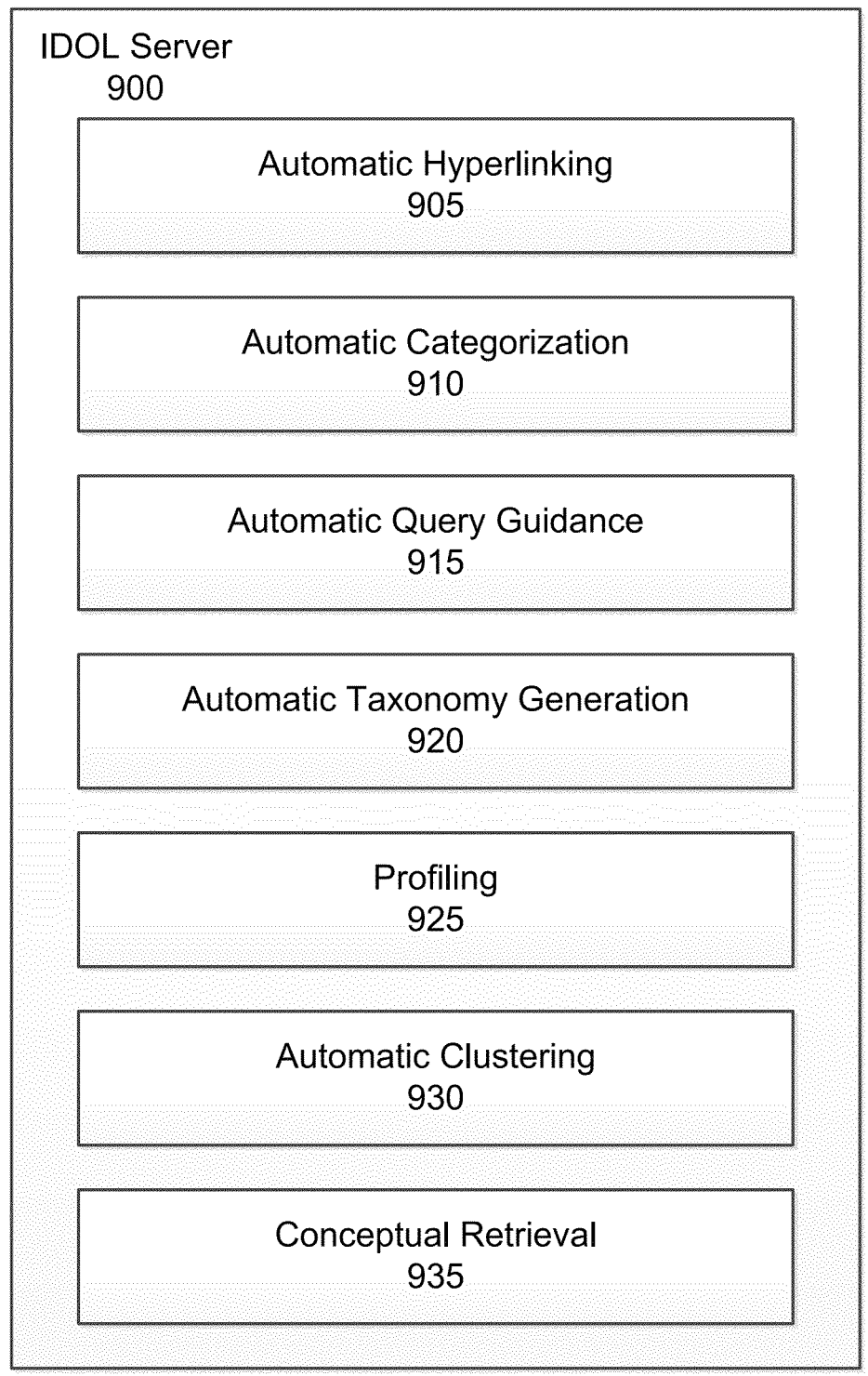
FIG. 5 illustrates an example block diagram of some modules of an IDOL server, in accordance with some embodiments.

For some embodiments, the backend reminder server system 352 may be implemented as an Intelligent Data Operating Layer (IDOL) server using the IDOL application and hardware system—a product of Autonomy Corporation of San Francisco, Calif. Other software and systems associated with the IDOL application may also be used. The IDOL application collects indexed data from connectors from various sources to train the engines and stores it in its proprietary structure, optimized for fast processing and retrieval of data. As the information processing layer, the IDOL application forms a conceptual and contextual understanding of all content in an enterprise, automatically analyzing any piece of information from over thousands of different content formats and even people's interests. Hundreds of operations can be performed on digital content by the IDOL application, including hyperlinking, agents, summarization, taxonomy generation, clustering, deduction, profiling, alerting and retrieval. The IDOL application has a knowledge base of concept information and is able to inter-relate the reminder target objects with the corresponding media. An example of the modules included in the IDOL application is illustrated in FIG. 5.

The IDOL application enables organizations to benefit from automation without losing manual control. This complementary approach allows automatic processing to be combined with a variety of human controllable overrides, offering the best of both worlds and never requiring an "either/or" choice. The IDOL application integrates with all known legacy systems, eliminating the need for organizations to cobble together multiple systems to support their disparate component.

The IDOL application may be associated with an IDOL connector which is capable of connecting to hundreds of content repositories and supporting over thousands of file formats. This provides the ability to aggregate and index any form of structured, semi-structured and unstructured data into a single index, regardless of where the file resides. The extensive set of connectors enables a single point of search for all enterprise information (including rich media), saving organizations much time and money. With access to virtually every piece of content, the IDOL application provides a 360 degree view of an organization's data assets.

The IDOL application implements a conceptual technology, is context-aware, and uses deep audio and video indexing techniques to find the most relevant products, including music, games and videos. The IDOL application categorizes content automatically to offer intuitive navigation without manual input. The IDOL application also generates links to conceptually similar content without the user having to search. The IDOL application may be trained with free-text descriptions and sample images such as a snapshot of a product. A business console presents live metrics on query patterns, popularity, and click-through, allowing the operators to configure the environment, set-up promotions and adjust relevance in response to changing demand.

For some embodiments, the visual recognition module 135 of the mobile computing device 100 may identify the characteristics of the objects and/or persons and then causes that information to be transmitted to an IDOL server in real time. Alternatively, the third party interface and/or the visual recognition module 135 of the mobile computing device 100 may send the object to an IDOL server to be processed.

The downloadable application and backend server system cooperate to use real world images and objects as triggers, merging them with rich interactive content such as videos and 3D animations called, "Auras". The downloadable application is available for mobile compting devices such as iPhone4, iPad2 and Android devices, the downloadable application is available in on-line data stores such as Apple's App Store and the Android Market.

The downloadable application and backend server system cooperate to change the way a user sees and interacts with the world by merging the physical with the virtual world. The downloadable application and backend server system cooperate to may chose ordinary objects as the "triggers"—a newspaper, a wireless router and a floor plan. The downloadable application and backend server system cooperate to bring these everyday things into digital life, showing just how useful this technology can be—whether it's delivering breaking news from a printed newspaper, showing you how to install a home entertainment system or even finding your way around a building.

The downloadable application and backend server system cooperate to provide an interactive platform that uses advanced image recognition technology to merge the physical and virtual worlds. Using a smart phone or tablet computer, the downloadable application and resident browser cooperate to be a visual browser, capable of recognizing objects in the real world and overlaying this view with interactive digital content such as video, 3D animation and audio.

FIG. 3B illustrates a diagram of an example of backend reminder server system that may be connected with one or more third party servers via the Internet, in accordance with some embodiments. The components included in the backend reminder server system 352 may be in addition to the components illustrated in FIG. 3A. The backend reminder server system 352 presents a user interface to the third party administrators to obtain an object/service/etc. to be a target object from the third party and/or present an already known target objects that the third party may configure trigger conditions and triggerable contributions with that known target object. The backend reminder server system 352 processes candidates for target objects from third party administrators in a similar fashion as described above for candidates for target objects from the mobile computing device.

The backend reminder server system 352 may receive information from a third party server 405. The third party server 405 may be associated with the third party database 409. The interface for third parties is presented by the backend server system. An administrator of the third party server interacts with the interface to register an object, including real world objects, services, broadcast programs, and movies, as a target object with the backend server system, and assigns trigger conditions with that target object. The object recognition engine 310 of the backend server system process the registered object to determine any identifying characteristics of that object, and then the reminder engine 308 stores the registered object, its identifying characteristics, and assigned trigger conditions into the target object database as a known target object. The backend reminder server system 352 stores the registered object/service/movie/etc. and stores the target object in the reminder target object database 315. The administrator may also register and associate trigger conditions and triggerable contributions with a target object.

Each third party server 405 may provide information that may be related to the reminders and may enhance the information about the reminders. For example, the third party information may include triggerable contributions including coupon information, product review and feedback information, etc. For some embodiments, the backend reminder server system 352 may store the third party information and may transmit the third party information to the mobile computing devices 300, 302 to be stored locally. In other embodiments, when the triggerable condition for a target object in a given downloadable reminder application is satisfied, then the reminder engine in the server system sends the latest triggerable contribution for that target object.

As an example, the administrator may register an image of a pair of brown shoes and associate that with target object a trigger condition of various geographical locations of shoe stores where the pair of brown shoes is sold. Reminders are now triggered when the location of the mobile computing device is near one of these shoe stores. The location information of the shoe stores in this example may be stored in the reminder target database 315, or it may be stored in a separate time and location database 316. In another example, the trigger condition of time associated with the target object is set by a third party. An identifiable upcoming sports event advertised on the Internet, TV, and news papers is submitted by the third party administrator. The administrator sets the trigger condition of time both one day before as well as an hour before the sports event is to start and triggerable contributions of video trailers, offers for tickets, etc. all associated with that target object. The reminder engine of the backend server system retrieves the content information from the fields of the template user interface presented to the third party administrator and sends the information to both 1) the set of databases for known target objects and their associated triggerable conditions and contributions, and 2) the various recognition engines so that one or more composite image recognition profiles of that target object are generated so that a match to the target object can be easily made when displayed on the mobile computing device.

As discussed, the third party may add triggerable contributions such as coupons, comparison charts, surveys, Advertisements, etc. when the target object is registered. The third party may select from a list of pre-selectable triggerable contributions presented via the third party interface or add a customized triggerable contribution for that object being identified by the administrator. The third party commercial partners interacts with the interface for third party's presented by the backend mirrored server system to allow consumers to intuitively and easily set reminders about target objects.

The backend server system also includes the user profile engine 328 and user profile database 360. The backend reminder server system 352 may tailor target objects, triggerable contributions, and even trigger conditions with information on those points that is more relevant to the user of the specific mobile computing device hosting the visual recognition module 135 by maintaining a user profile. The user profile database 360 is maintained to represent each user's interests, demographics, and/or specific patterns of use, which can be referenced by the user profile engine 328 when determining what type of information to augment a target object. The user profile engine 320 may be associated with the user profile database 328 which is configured to store information about registered users and/or mobile computing devices. The user profile engine 320 may be also configured to validate registered mobile computing devices 300, 302.

Using the user profile engine 320 and the user profile database 328, the backend reminder server system 352 may be configured to store information related to the current and well as past reminder target objects in the reminder database 307. The backend reminder server system 352 may also be configured to keep track of the instances of application modules that have been downloaded to the mobile computing devices 300, 302. When a user switches from one mobile computing device to a new mobile computing device, the backend reminder server system 352 is able to recognize the switch and update the new mobile computing device automatically using the stored information.

In an embodiment, the IDOL server system may automatically profile the way the users interact with each other and with information on their mobile computing devices, build a conceptual understanding of their interests and location to deliver tailored commercial content. The IDOL server provides automatic notification as soon as new tracks and relevant products are released, or location-specific information such as traffic reports and up-to-the-minute news, without the user having to search.

The backend server system and its set of engines 300 and set databases are trained on a set of views of the world and the models derived are stored for future retrieval. The engines may use the combination of geographical information and visual characteristics to allow a faster matching. Following this, the downloadable reminder application in the mobile computing device can be deployed to collect geospatial information and a video data stream from the camera and feed it back to the system. This is used to pinpoint the objects or locations within view and augment the video stream with additional visual or audiovisual objects or images.

Figure 6:
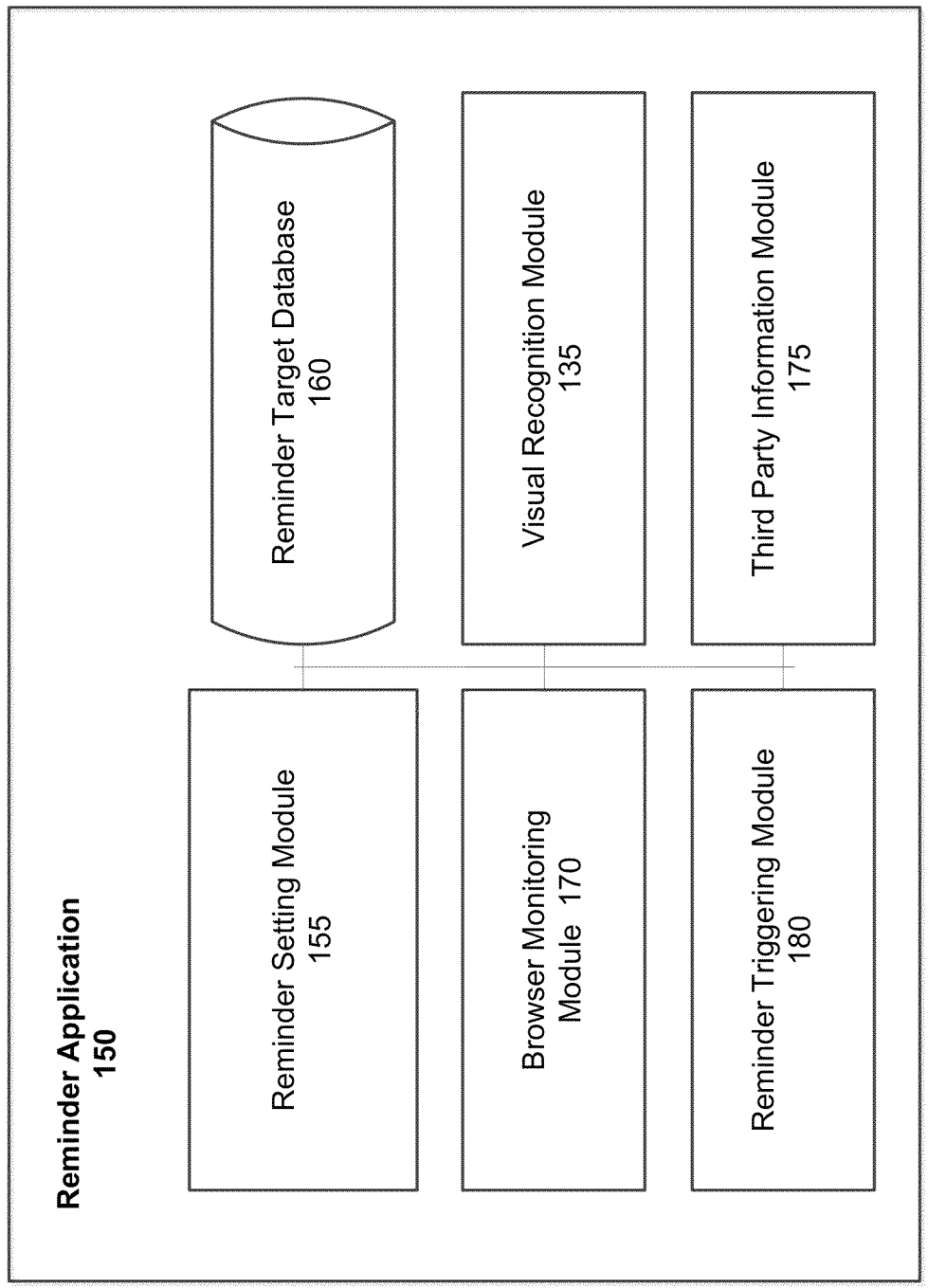
FIG. 6 illustrates a block diagram of example architecture of an embodiment of the downloadable reminder application in the mobile computing device.

FIG. 6 illustrates a block diagram of example architecture of an embodiment of the downloadable reminder application 150 in the mobile computing device. The downloadable reminder application 150 may include one or more application modules to enable a user of the mobile computing device 100 to set future reminders. These application modules may include reminder setting module 155, visual recognition module 135, browser monitoring module 170, third party information module 175, and future reminder triggering module 180. One or more of these modules may be downloaded to the mobile computing device 100 from the reminder engine in the server 300 that the mobile computing device 100 is connected with.

The reminder setting module 155 may be configured to enable the user to affirmatively select the objects/services/broadcast programs displayed on the display screen of the mobile computing device 100 and flag them as the reminder target objects. The browser monitoring module 170 may work together with the reminder setting module 155 and may be configured to monitor web pages that the user may be viewing on the display screen and to enable the user to select objects/services/broadcast programs displayed via those web pages and flag them as the reminder target objects. Alternatively a set of objects in the video feed or the internet browsing can both be identified and be associated with the third party information provided by the third party information module 175.

Information associated with the reminder target objects may then be processed to identify the reminder target objects. The recognition module 135 may be configured to process the reminder target objects or information associated with the reminder target objects to determine whether the reminder target objects are recognized as previously known targets. Information about the previously known targets may be stored in the target database 160. The target database 160 may include other information related to the previously known targets. For example, the target database 160 may include information about the shoe stores that sell particular types of shoes and the location of those shoe stores. It may be noted that different techniques may be used to implement the target database 160. For example, the target database 160 may simply be a cache memory inside the mobile computing device 100.

Comparison operations may be performed by the recognition module 135. When the reminder target is recognized, the reminders may be established by the reminder triggering module 180. The reminders may be triggered based on the location (e.g., corner of 5th street and Main Street) of the mobile computing device or based on a time (e.g., Wednesday at 7:00 p.m.). The third party information module 175 may be configured to provide information related to the reminder target objects. For example, the third party may be a shoe manufacturing company (e.g., Nike), and it may have a coupon to encourage the user to purchase a pair of Nike brown shoes when the reminder is about a pair of brown shoes. The information from the third party may be displayed along with the reminder.

It may be noted that each reminder may be associated with multiple matching results, and the user of the mobile computing device 100 may be presented with a list of all the possible matching results. For example, the user may use the mobile computing device 100 to capture a video or image of a pair of brown shoes. The user may then select the brown shoes from that video or image and flag them as a reminder target. The application modules in the mobile computing device 100 may perform operations to recognize the brown shoes and establish the reminders. At a subsequent time (e.g., four days later), when the user is walking through a shopping mall, a reminder may be triggered based on the location of the mobile computing device 100 using its GPS feature. The reminder is triggered because the application modules determine that there are many shoe stores in that shopping center sell brown shoes similar to the ones that the user previously flagged. The reminder may be displayed on the display screen of the mobile computing device 100 along with other related information. It should be noted that the information about the location of the shoe stores and the types of shoes that each shoe store sells have already been stored in the target database 160.

For some embodiments, the user may use a combination of selecting and flagging objects/services/programs that have not been pre-recognized and flagging the objects/services/programs that have been pre-recognized as the reminder target objects. Note, the target object may include video or still images of a real world object, a service, a movie, a broadcast program, etc. The future reminders may be triggered based on a location, a specific time or both. For some embodiments, the specific time may be determined by a third party. For example, the target object may be a broadcast program by NBC broadcasting television network. The user may select the broadcast program as a target object by using the mobile computing device to capture an image on a billboard promoting the broadcast program. The recognition module 135 in the mobile computing device 100 may recognize the image as being associated with the broadcast program to be broadcast by NBC. The recognition module 135 may further identify that the broadcast program will be broadcast at 7:00 p.m. on Saturday on NBC Channel 11. That information may be sent to a reminder triggering module 180 which triggers the future reminder at 7:00 p.m. on Saturday. The future reminder may be displayed along with the information about the broadcast program and the television channel that the user may want to tune the television to watch the broadcast program. For some embodiments, the future reminders may be triggered based on a specific time set by the user or based on recognition of a target object from a current video feed.

Mirroring and Distributed Processing

FIG. 4 illustrates an example diagram of a network of mirrored backend reminder server system that may be used to perform the reminder processing, in accordance with some embodiments. In this example, each server site is represented by one server computer for simplicity. However, it should be understood that each server site may include multiple server computers working together collaboratively in a distributive manner. Server computers 405M, 405A, 405B and 405C connected to the network 200 may be configured as IDOL servers. The IDOL servers may include a main IDOL server 405M and multiple mirrored IDOL servers 405A-405C. The main IDOL server 405M may mirror its information onto the mirrored IDOL servers 405A-405C.

The mirroring may include mirroring the content of the main IDOL server database 406M into the mirrored IDOL sever databases 406A-406C. For example, the application module database 308, the target database 315, and the user profile database 328 may be mirrored across all of the mirrored IDOL servers 405A-405C. The main IDOL server 405M and the mirrored IDOL servers 405A-405C may be located or distributed in various geographical locations to serve the mobile computing devices in these areas. For example, the main IDOL server 405M may be located in Paris, the mirrored IDOL server 405A may be located in Boston, 405B in Philadelphia, and 405C in New York. As discussed, the mirroring of a server computer in one location with another server computer in another location may be understood as the mirroring of a server site with all of its server computers together with associated hardware and content.

For some embodiments, a set two or more IDOL servers may work together in a cooperative and distributive manner to do the work of the object recognition engine 310 described in FIG. 3A. For example, there may be a set of two or more IDOL servers in Boston configured to perform the operations of the object recognition engine 310. Similarly, a set of two or more IDOL servers may work together in the same cooperative and distributive manner to do the work of the reminder processing 308 or the user profile engine 320. This allows the functionalities of the object recognition engine 310, the reminder engine 308 and the user profile engine 320 amongst the set of server computers to be performed in a faster manner. The dotted lines 451, 452 and 453 are used to illustrate examples of the IDOL mirrored servers working together collaboratively. The dotted lines 450 and 454 are used to illustrate the IDOL servers processing of the requests from the mobile computing devices 410A and 410B.

The distribution of server computers within a given location or sister location may help improving the response time of the reminder processing operations. The mirroring of sites with identical compositions of hardware and content may also help improving the response time of the reminder processing operations. In addition, the mirroring of identical server site locations aids in servicing potentially millions of mobile computing devices with the downloadable reminder processing application modules to select target objects and to trigger the future reminders by distributing the workload and limiting the physical transmission distance and associated time. The IDOL server set being duplicated with the same content and mirrored across the Internet to distribute this load to multiple identical sites to increase both response time and handle the capacity of the queries by those mobile computing devices. Load balancing techniques may also be used to improve response time.

Combining the visual information and the geographical information may allow a rapid recognition or matching to the characteristics of objects that are known and pre-stored in an object database. The geographical information may be provided by a global positioning system (GPS). Combining the visual information with the geographical information may reduce the amount of possible points of interest that need to be sorted through by a server computer to identify and recognize known objects and/or persons. The rough geographical information from the GPS reduces the amount of possible points of interest that need to be sorted through as a possible match to known objects in that area.

Intelligent Data Operating Layer (IDOL) Server

FIG. 5 illustrates an example block diagram of some modules of an IDOL server, in accordance with some embodiments. IDOL server 900 may include automatic hyperlinking module 905, automatic categorization module 910, automatic query guidance module 915, automatic taxonomy generation module 920, profiling module 925, automatic clustering module 930, and conceptual retrieval module 935. The automatic hyperlinking module 905 is configured to allow manual and fully automatic linking between related pieces of information. The hyperlinks are generated in real-time at the moment the document is viewed. The automatic categorization module 910 is configured to allow deriving precise categories through concepts found within unstructured text, ensuring that all data is classified in the correct context.

The automatic query guidance module 915 is configured to provide query suggestions to find most relevant information. It identifies the different meanings of a term by dynamically clustering the results into their most relevant groupings. The automatic taxonomy generation module 920 is configured to automatically generate taxonomies and instantly organizes the data into a familiar child/parent taxonomical structure. It identifies names and creates each node based on an understanding of the concepts with the data set as a whole. The profiling module 925 is configured to accurately understand individual's interests based on their browsing, content consumption and content contribution. It generates a multifaceted conceptual profile of each user based on both explicit and implicit profiles.

The automatic clustering module 930 is configured to help analyze large sets of documents and user profiles and automatically identify inherent themes or information clusters. It even cluster unstructured content exchanged in emails, telephone conversations and instant messages. The conceptual retrieval module 935 is configured to recognize patterns using a scalable technology that recognizes concepts and find information based on words that may not be located in the documents. It should be noted that the IDOL server 900 may also include other modules and features that enable it to analyze the objects and other information content sent by the interface for third parties and downloadable reminder application.

Computing System

FIG. 7 illustrates a block diagram of an example computing system that may use an embodiment of one or more of the software applications discussed herein. The computing system environment 800 is only one example of a suitable computing environment, such as a client device, and is not intended to suggest any limitation as to the scope of use or functionality of the design. Neither should the computing environment 800 be interpreted as having any dependency or requirement relating to any one or combination of components illustrated in the exemplary operating environment 800.

As discussed, the computing system may be a client mobile computing system. The system includes a processor, a memory, a built in battery to power the mobile computing device, a built-in video camera and display screen for the mobile computing device, and built-in Wi-Fi circuitry to wirelessly communicate with a server computer connected to network.

The design is operational with numerous other general purpose or special purpose computing system environments or configurations. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The design may be described in the general context of computing device executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine readable media discussed below.

The design may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary computing type system for implementing the design includes a general-purpose computing device in the form of a computer 810. Components of computer 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus.

Computer 810 typically includes a variety of computing machine readable media. Computing machine readable media can be any available media that can be accessed by computer 810 and includes both volatile and nonvolatile media, removable and non-removable media. By way of example, and not limitation, computing machine readable mediums uses include storage of information, such as computer readable instructions, data structures, program modules or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by computer 800. Communication media typically embodies computer readable instructions, data structures, program modules, or other transport mechanism and includes any information delivery media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display screen is also connected to the system bus 821 via an interface, such as a video interface 890. In addition to the monitor, computers may also include other peripheral output devices such as speakers 897 and printer 896, which may be connected through an output peripheral interface 890.

The computer 810 may operate in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet. A browser application may be resident on the computing device and stored in the memory.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user-input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

It should be noted that the present design can be carried out on a computing system such as that described with respect to FIG. 7. However, the present design can be carried out on a server, a computer devoted to message handling, or on a distributed system in which different portions of the present design are carried out on different parts of the distributed computing system.

Another device that may be coupled to bus 811 is a power supply such as a battery and Alternating Current adapter circuit. As discussed above, the DC power supply may be a battery, a fuel cell, or similar DC power source that needs to be recharged on a periodic basis. The wireless communication module 872 may employ a Wireless Application Protocol to establish a wireless communication channel. The wireless communication module 872 may implement a wireless networking standard such as Institute of Electrical and Electronics Engineers (IEEE) 802.11 standard, IEEE std. 802.11-1999, published by IEEE in 1999.

While other systems may use, in an independent manner, various components that may be used in the design, a comprehensive, integrated system that addresses the multiple advertising system points of vulnerability described herein does not exist. Examples of mobile computing devices may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

Network Environment

FIG. 2 illustrates a diagram of a network environment in which the techniques described may be applied. The network environment 200 has a network 202 that connects server computing systems 204-1 through 204-*n*, and at least one or more client computing systems 200-1. As shown, there may be many server computing systems 204-1 through 204-*n* and many client computing systems 200-1 through 200-*n* connected to each other via a network 220, which may be, for example, the Internet. Note, that alternatively the network 220 might be or include one or more of: an optical network, the Internet, a Local Area Network (LAN), Wide Area Network (WAN), satellite link, fiber network, cable network, or a combination of these and/or others. It is to be further appreciated that the use of the terms client computing system and server computing system is for clarity in specifying who generally initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 200-1 and the server computing system 204-1 can both initiate and respond to communications, their communication may be viewed as peer-to-peer. Likewise, communications between the client computing systems 204-1 and 204-2, and the server computing systems 200-1 and 200-2 may be viewed as peer-to-peer if each such communicating device is capable of initiation and response to communication. One or more of the server computing systems 204-1 to 204-*n* may be associated with a database such as, for example, the databases 206-1 to 206-*n*. A firewall such as, for example, the firewall may be established between a client computing system 200-3 and the network 220 to protect data integrity on the client computing system 200-3.

FIG. 2 also illustrates a block diagram of an embodiment of a server computing system to display information, such as a web page, etc. The application, such as a social network application (e.g., Twitter), when executed on the server computing system 204-1, causes the server computing system 204-1 to display windows and user interface screens on a portion of a media space, such as a web page. A user via a browser from the client computing system 200-1 may interact with the web page, and then supply input to the query/fields and/or service presented by a user interface of the application. The web page may be served by a web server computing system 204-1 on any Hypertext Markup Language (HTML) or Wireless Access Protocol (WAP) enabled client computing system 200-1 or any equivalent thereof. For example, the client mobile computing system 200-1 may be a smart phone, a touch pad, a laptop, a netbook, etc. The client computing system 200-1 may host a browser to interact with the server computing system 204-1. Each application, widget, plug-in, etc. has a code scripted to perform the functions that the software component is coded to carry out such as presenting fields and icons to take details of desired information. Algorithms and engines within the server computing system 204-1 take the information from the presenting fields and icons and put that information into an appropriate storage medium such as a database. The applications may be hosted on the server computing system 204-1 and served to the browser of the client computing system 200-1. The applications then serve pages that allow entry of details and further pages that allow entry of more details.

Any application and other scripted code components may be stored on a computing machine readable medium which, when executed on the machine causes the machine to perform those functions. In an embodiment, the software used to facilitate the functions and processes described herein can be embodied onto a computing machine readable medium such as computer readable medium. As discussed above a computing machine readable medium includes any mechanism that provides (e.g., stores) information in a form readable by a machine (e.g., a computer). For example, a computing machine readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. The downloadable reminder application may be implemented as software code, hardware logic circuits, and any combination of the two, and portions of the downloadable reminder application scripted in software code are stored in a non-transitory computing device readable medium in an executable format.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C++, Java, or other similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers, or other such information storage, transmission or display devices.

The present concept also relates to apparatus for performing the operations herein. This apparatus may be specially constructed for the required purposes, or it may comprise a general purpose computer selectively activated or reconfigured by a computer program stored in the computer.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. For example, several specific modules have been shown. Each module performs a few specific functions. However, all of these functions could be grouped into one module or even broken down further into scores of modules. Most functions performed by electronic hardware components may be duplicated by software emulation and vice versa. The invention is to be understood as not limited by the specific embodiments described herein, but only by scope of the appended claims.

What is claimed is:

1. An apparatus, comprising:
    a processor; and
    a memory on which is stored machine readable instructions that when executed by a processor cause the processor to:
        transmit data pertaining to a flagged object from an internet browsing session to an object recognition engine in a backend server system, wherein the object is flagged by a user from a web browser application displayed on a screen of the apparatus;
        receive a list of candidate target objects from the object recognition engine, wherein the object recognition engine determines the list based on data pertaining to a plurality of objects stored in the backend server system that are determined to be similar to the flagged object;
        display the list of candidate target objects on the display screen;
        receive a user selection of a target object from the displayed list of candidate target objects;
        set a future reminder on the target object to be triggered based on at least one of a local and a temporal trigger condition;
        determine whether at least one of the local and the temporal trigger conditions for the target object has been satisfied; and
        in response to a determination that at least one of the local and the temporal trigger conditions for the target object has been satisfied, notify a user that a triggerable contribution associated with the target object has been triggered, wherein the triggerable contribution includes price comparison information.

2. The apparatus of claim 1, wherein the machine readable instructions are further to cause the processor to:
    identify an object in a frame of a captured video stream; and
    determine whether the target object is contained in the frame of the captured video stream.

3. The apparatus of claim 2, wherein to determine whether the target object is contained in the frame of the captured video stream, the machine readable instructions are further to cause the processor to compare the identified object in the frame of the captured video stream to target objects stored in a local target object database of the apparatus to determine if there is a match between the identified object and the target objects stored in the local target object database, wherein the local target object database stores a subset of target objects stored in a backend target object database in the backend server system.

4. The apparatus of claim 2, wherein to determine whether the target object is contained in the frame of the captured video stream, the machine readable instructions are further to cause the processor to:
    determine distinguishing features of the identified object using optical character recognition (OCR);
    extract the determined distinguishing features of the identified object; and
    code the distinguishing features of the identified object into a digital fingerprint; and
    compare the digital fingerprint with a set of digital fingerprints of target objects stored in a local target object database of the apparatus.

5. The apparatus of claim 1, wherein the machine readable instructions are further to cause the processor to:
    request a packet of digital fingerprints of target objects that have actionable trigger conditions from the backend server system; and
    update target objects stored in a local target object database of the apparatus with the packet of digital fingerprints received from the backend server system.

6. The apparatus of claim 5, wherein, in response to the determination that at least one of the local and the temporal trigger conditions for the target object has been satisfied, the machine readable instructions are further to cause the processor to notify the user of the triggerable contribution including one or more of identification or descriptive information, advertisement information, link information, user review information, and coupons.

7. The apparatus of claim 1, wherein the machine readable instructions are further to cause the processor to:
    in response to a communication between the apparatus and the backend server system being interrupted,
        store the flagged object in a local target object database;
        determine a local list of candidate target objects based on data pertaining to objects stored in the local target object database that are determined to be similar to the flagged object;
        display the local list of candidate target objects on the display screen;
        receive a user selection of a local target object from the displayed local list of candidate target objects;
        set a future reminder on the local target object in the local target object database; and
        transmit the flagged object, the selected target object, and the future reminder to the backend server system in response to the communication between the apparatus and the backend server system being reestablished.

8. A computer-implemented method comprising:
- displaying, by a processor of a mobile device, an image of an object in a web browser application of the mobile device;
- receiving an input from a user to flag the image of the object in the web browser application;
- transmitting the image of the flagged object to a recognition engine in a backend server system;
- receiving a list of candidate target objects from the recognition engine, wherein the recognition engine determines the list based on data pertaining to a plurality of objects stored in the backend server system that are determined to be similar to the flagged object;
- displaying the list of candidate target objects on a display screen;
- receiving a user selection of a target object from the displayed list of candidate target objects;
- setting a future reminder on the target object to be triggered based on at least one of a local or temporal trigger condition;
- determine whether at least one of the local and the temporal trigger condition for the target object has been satisfied; and
- in response to a determination that at least one of the local and the temporal trigger conditions for the target object has been satisfied, notifying a user that a triggerable contribution associated with the target object has been triggered, wherein the triggerable contribution includes price comparison information.

9. The computer-implemented method of claim 8, further comprising:
- in response to a communication between the mobile device and the backend server system being interrupted,
  - storing the flagged object in a local target object database of the mobile device;
  - determining a local list of candidate target objects based on data pertaining to objects stored in the local target object database that are determined to be similar to the flagged object;
  - displaying the local list of candidate target objects on the display screen;
  - receiving a user selection of a local target object from the displayed local list of candidate target objects;
  - setting a future reminder on the local target object in the local target object database; and
  - transmitting the flagged object, the selected target object, and the future reminder to the backend server system in response to the communication between the mobile device and the backend server system being reestablished.

10. The computer-implemented method of claim 8, further comprising providing a user interface to a third party to select the target object, set the trigger conditions for the target object, and send packets containing data pertaining to the target objects and their trigger conditions to a local target object database in the mobile device.

11. The computer-implemented method of claim 8, wherein the backend server system includes a database to store a backup copy of the future reminders and a history of expired reminders.

12. A non-transitory computer readable storage medium storing machine-readable instructions that when executed by a processor, cause the processor to:
- transmit data pertaining to a flagged object from an internet browsing session to an object recognition engine in a backend server system, wherein the object is flagged by a user from a web browser displayed on a display screen of a mobile device;
- receive a list of candidate target objects from the object recognition engine, wherein the object recognition engine determines the list based on data pertaining to a plurality of objects stored in the backend server system that are determined to be similar to the flagged object;
- display the list of candidate target objects on the display screen;
- receive a user selection of a target object from the displayed list of candidate target objects;
- set a future reminder on the target object to be triggered based on at least one of a local and a temporal trigger condition;
- determine whether at least one of the local and the temporal trigger condition for the target object has been satisfied; and
- in response to a determination that at least one of the local and the temporal trigger conditions for the target object has been satisfied, notify a user that a triggerable contribution associated with the target object has been triggered, wherein the triggerable contribution includes price comparison information.

13. The non-transitory computer readable storage medium of claim 12, wherein the machine readable instructions are further to cause the processor to:
- in response to the determination that at least one of the local and the temporal trigger conditions for the target object has been satisfied, notify the user of the triggerable contribution including one or more of identification or descriptive information, advertisement information, link information, user review information, and coupons.

14. The non-transitory computer readable storage medium of claim 12, wherein the machine readable instructions are further to cause the processor to:
- provide a user interface to a third party to select the target object, set the trigger conditions for the target object, and send packets containing data pertaining to the target objects and their trigger conditions to a local target object database in the mobile device.

15. The non-transitory computer readable storage medium of claim 12, wherein the machine readable instructions are further to cause the processor to:
- in response to a communication between the mobile device and the backend server system being interrupted,
  - store the flagged object in a local target object database;
  - determine a local list of candidate target objects based on data pertaining to objects stored in the local target object database that are determined to be similar to the flagged object;
  - display the local list of candidate target objects on the display screen;
  - receive a user selection of a local target object from the displayed local list of candidate target objects;
  - set a future reminder on the local target object in the local target object database; and
  - transmit the flagged object, the selected target object, and the future reminder to the backend server in response to the communication between the mobile device and the backend server system being reestablished.

16. The non-transitory computer readable storage medium of claim 12, wherein the machine readable instructions are further to cause the processor to:

request a packet of digital fingerprints of target objects that have actionable trigger conditions from the backend server system; and update target objects stored in a local target object database of the mobile device with the packet of digital fingerprints received from the backend server system.

* * * * *